UNITED STATES PATENT OFFICE.

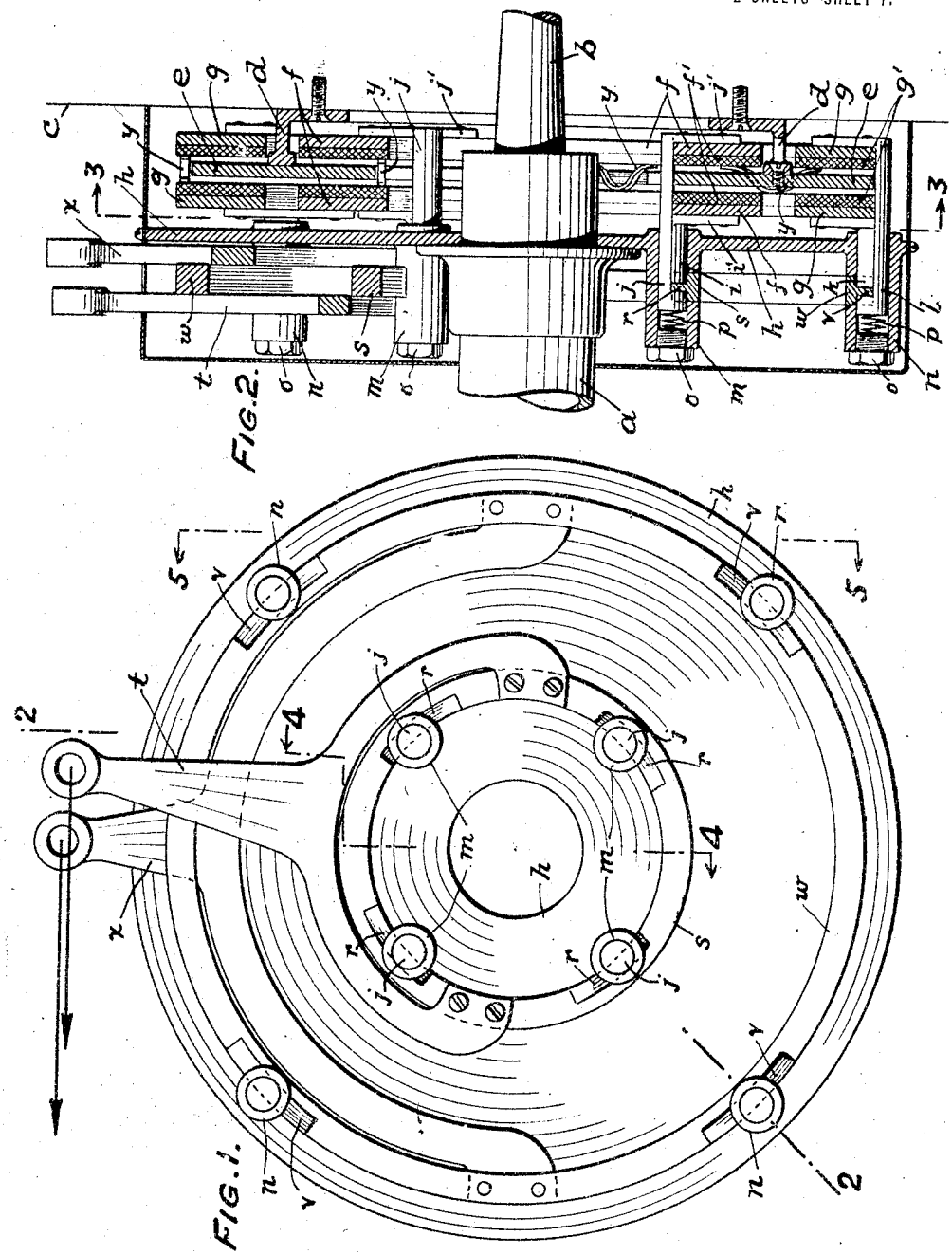

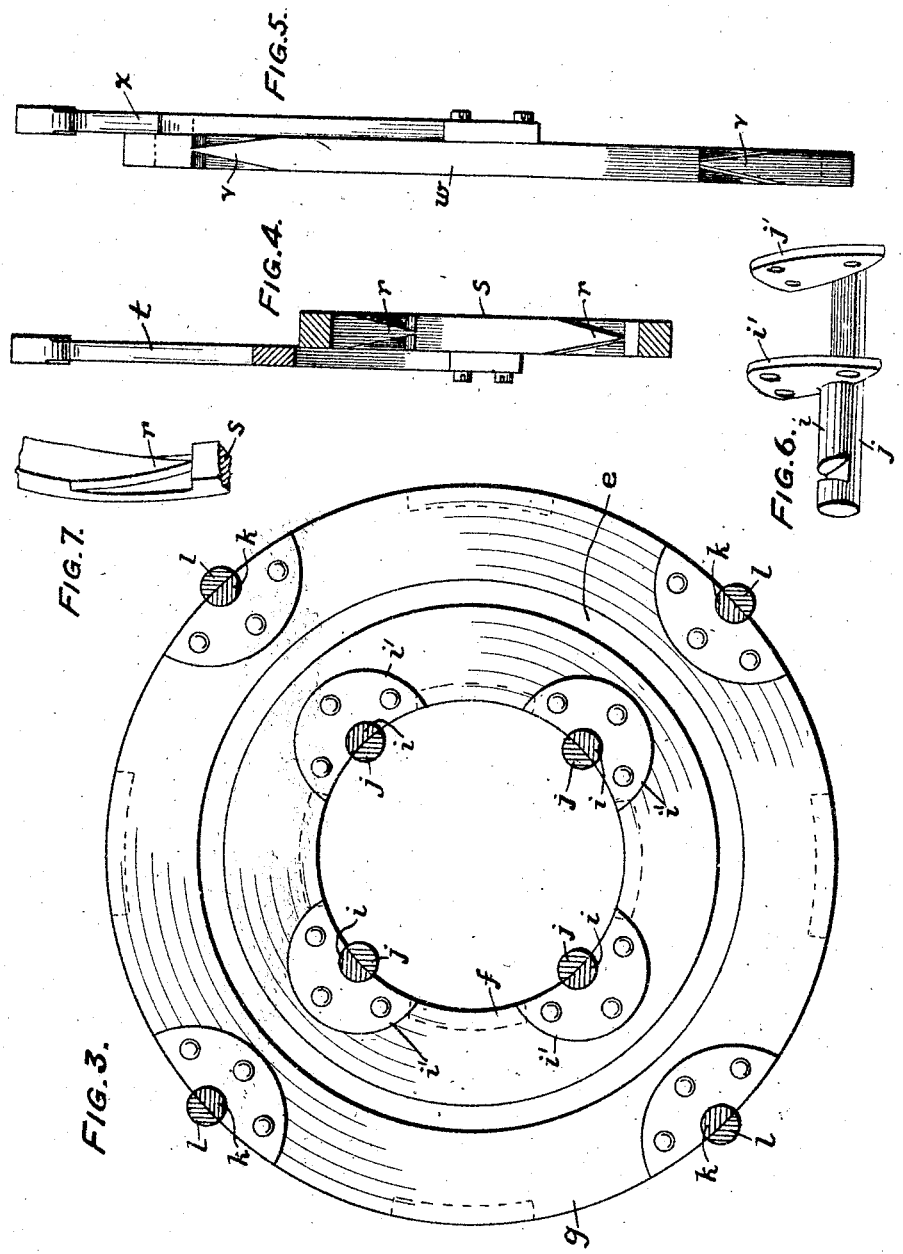

WILLIAM W. ROACH, OF PHILADELPHIA, PENNSYLVANIA.

AUTOMOBILE-BRAKE.

1,171,655.   Specification of Letters Patent.   Patented Feb. 15, 1916.

Application filed May 19, 1915. Serial No. 29,081.

*To all whom it may concern:*

Be it known that I, WILLIAM W. ROACH, a citizen of the United States, residing at Philadelphia, county of Philadelphia, and State of Pennsylvania, have invented a new and useful Improvement in Automobile-Brakes, of which the following is a full, clear, and exact description, reference being had to the accompanying drawings, which form a part of this specification.

The object of my invention is to effectively apply a braking action to an automobile wheel or to any other wheeled vehicle by bringing a disk rotating with the wheel into frictional contact with one or more non-rotating plates and preferably with one or both of two pairs of concentric annular plates connected respectively to the devices adapted for independent actuation by the hand and by the foot.

A preferred embodiment of the invention is shown in the accompanying drawings, in which—

Figure 1 is a face view of the apparatus showing more especially the devices for operating both sets of brake-plates. Fig. 2 is a section on the line 2—2 of Fig. 1. Fig. 3 is a section looking in the direction of the arrow 3—3 of Fig. 2. Fig. 4 is a section on the line 4—4 of Fig. 1, showing the hand-actuated device for frictionally applying the inner pair of friction plates. Fig. 5 is a view looking in the direction of the arrow 5—5 of Fig. 1, showing the foot operated device for frictionally applying the outer pair of friction plates. Fig. 6 is a perspective view of two of the slides (connected to one pair of friction plates) which are operated by one of the actuating devices above named. Fig. 7 is a perspective view of one of the wedge sections of one of the actuating devices.

Within the axle tube $a$ is the axle $b$ to which is secured the wheel, one edge of the wheel spokes being indicated by the line $c$ of Fig. 2. To the wheel $c$ is secured brackets $d$ carrying an annular disk $e$. Inside brackets $d$ are two annular plates $f, f$, on opposite sides of disk $e$. These plates may be faced with a suitable friction material $f'$. Outside brackets $d$ are two annular plates $g$ on opposite sides of disk $e$. These plates may also be faced with a suitable friction material $g'$.

To axle tubes $a$ is secured a plate $h$ having two sets of tubular pockets extending parallel to the axle. One set of tubes $m$ receives sliding members which connect with friction plates $f, f$. The other set of tubes $n$ receives sliding members connected with friction plates $g, g$. Thus, to the friction plate $f$ nearest the fixed plate $h$ is secured a bracket $i'$ supporting a semi-circular slide $i$ extending into the tube $m$. To the friction plate $f$ on the other side of disk $e$ is secured a bracket $j'$ carrying a slide $j$ extending into the tube alongside slide $i$ and being, throughout this part of its length, of semi-circular cross-section, but extending beyond slide $i$ and having an end or head of circular cross-section which is spaced from slide $i$ to receive a wedge hereinafter described. The end of tube $m$ is closed by a threaded plug $o$. A spring $p$, confined between plug $o$ and head of slide $j$, tends to maintain the more distant plate $f$ spaced from disk $e$. The other set of tubes $n$ receives similar slides $k$ and $l$ which are simultaneously connected to the two plates $g, g$. These tubes have also threaded plugs $o$ and springs $p$.

There is a wedge $r$ for each tube $m$ and a wedge $v$ for each tube $n$. The set of wedges $r$ is carried on the inside of a turnable ring $s$ to which is secured an arm $t$ which, through suitable connections, may be operated manually (preferably by hand) to turn ring $s$ so as to cause each wedge $r$ to pass between the end of a slide $i$ and the head of corresponding slide $j$, thereby causing the slides to move in opposite directions and applying both plates $f, f$ to the disk $e$.

The set of wedges $v$ is carried on the outside of a turnable ring $w$ to which is secured an arm $v$ which, through suitable connections, may be operated manually (preferably by foot) to turn ring $w$ so as to cause each wedge $v$ to pass between the end of a slide $k$ and the head of corresponding slide $l$, thereby causing the slides to move in opposite directions and applying both plates $g, g$ to the disk $e$. Leaf springs $y$ may be arranged between the plates $f, g$ on one side of disk $e$ and the plates $f, g$, on the other side of disk $e$ thereby holding all the plates out of contact with the disk.

The described construction, which may be modified in detail without departing from my invention, is not expensive to construct, occupies a small amount of space, affords a great area of brake surface, and operates with ease, smoothness, certainty and power.

Having now fully described my invention, what I claim and desire to protect by Letters Patent is:

1. A disk brake comprising a friction disk turning with the wheel, a pair of annular friction plates, said plates arranged on opposite sides of the disk, a fixed plate and a number of pockets carried thereby, slides secured to the nearer friction plate and extending into said pockets, slides secured to the more distant friction plate and extending into said pockets and beyond the other slides, wedges each extending between a pair of slides in one of the pockets, and a manually operable turnable device carrying said wedges.

2. A disk brake comprising a friction disk turning with the wheel, a pair of annular friction plates, said plates arranged on opposite sides of the disk, a series of pairs of slides secured to the respective plates, a turnable ring, a series of wedges carried on one face of the ring and movable between the slides of the respective pairs, and an arm for operating the ring.

3. A disk brake comprising a friction disk turning with the wheel, two pairs of annular friction plates located at different distances from the wheel's axis, the two plates of each pair located on opposite sides of the disk, and means to simultaneously move the two plates of each pair toward each other against opposite faces of the disk.

4. A disk plate comprising a wheel, a friction disk, brackets secured to the wheel and supporting the disk, two annular friction brakes on opposite sides of the disk outside said brackets, two annular friction brakes on opposite sides of the disk inside said brackets, means to simultaneously move the outside plates toward each other against the disk, and independent means to simultaneously move the inside plates toward each other against the disk.

5. A disk brake comprising a friction disk turning with the wheel, two pairs of annular friction plates located at different distances from the wheel's axis, the two plates of each pair located on opposite sides of the disk, a series of pairs of slides secured to the respective plates of each pair, two turnable rings, a series of wedges carried on one face of one ring and movable between the slides of the respective pairs of slides of one series, a series of wedges carried on one face of the other ring and movable between the slides of the respective pairs of the other series, and independently operable arms for operating the respective rings.

6. A disk plate comprising an axle tube, a fixed plate secured thereto, an axle within the tube, a wheel secured to the axle, pockets secured to said plate and extending parallel to the wheel's axis, a disk in fixed relation with the wheel, friction plates on opposite sides of the disk, slides secured to said plates and extending into said tubular pockets, turnable arms, and wedges carried thereby extending into said pockets and adapted, when turned with their arms, to cause the slides to move in opposite directions and thereby frictionally apply the friction plates to the disk.

7. A disk brake comprising a member having pockets, a disk turning with the wheel, friction plates on opposite sides thereof, pairs of slides connected to the plates, the two slides of each pair connected to opposite plates and entering a pocket, manually operable wedges each adapted to engage the two slides of a pair and move their corresponding plates toward each other against the disk, threaded plugs closing the pockets, and a spring confined in each pocket between the plug and one of the slides.

In testimony of which invention, I have hereunto set my hand, at Philadelphia, on this 18th day of May, 1915.

WILLIAM W. ROACH.